3 Sheets—Sheet 1.

C. W. SIEMENS.

MANUFACTURE OF IRON AND STEEL.

No. 9,832. Reissued Aug. 9, 1881.

Witnesses:

F. M. Burnham

W. C. Skaffe

Inventor:

C. W. Siemens by A. Whitman atty

3 Sheets—Sheet 2.

C. W. SIEMENS.

MANUFACTURE OF IRON AND STEEL.

No. 9,832. Reissued Aug. 9, 1881.

Witnesses:
F. M. Burnham
W. Schaffer

Inventor:
C. W. Siemens
by C. S. Whitman
atty

3 Sheets—Sheet 3

C. W. SIEMENS.

MANUFACTURE OF IRON AND STEEL.

No. 9,832. Reissued Aug. 9, 1881.

Witnesses:

F. M. Burnham

W. Chaffee

Inventor:

C. W. Siemens by C. W. Whitman atty.

UNITED STATES PATENT OFFICE.

CHARLES WILLIAM SIEMENS, OF WESTMINSTER, COUNTY OF MIDDLESEX, ENGLAND.

MANUFACTURE OF IRON AND STEEL.

SPECIFICATION forming part of Reissued Letters Patent No. 9,832, dated August 9, 1881.

Original No. 159,712, dated February 9, 1875. Application for reissue filed December 3, 1880.

DIVISION A.

*To all whom it may concern:*

Be it known that I, CHARLES WILLIAM SIEMENS, of Westminster, in the county of Middlesex, England, have invented an Improvement in Regenerative Furnaces; and I do hereby declare that the following description, taken in connection with the accompanying sheet of drawings, hereinafter referred to, forms a full and exact specification of the same, wherein I have set forth the nature and principles of my said improvement, by which my invention may be distinguished from others of a similar class, together with such parts as I claim and desire to secure by Letters Patent.

My invention relates to that class of furnaces for which Letters Patent of the United States were granted to Frederick Siemens and myself March 1, 1864; and the nature thereof consists in combining with the regenerators and passages leading therefrom a rotative chamber, which may be used for the manufacture of iron and steel, and for other metallurgical purposes.

Figure 1:
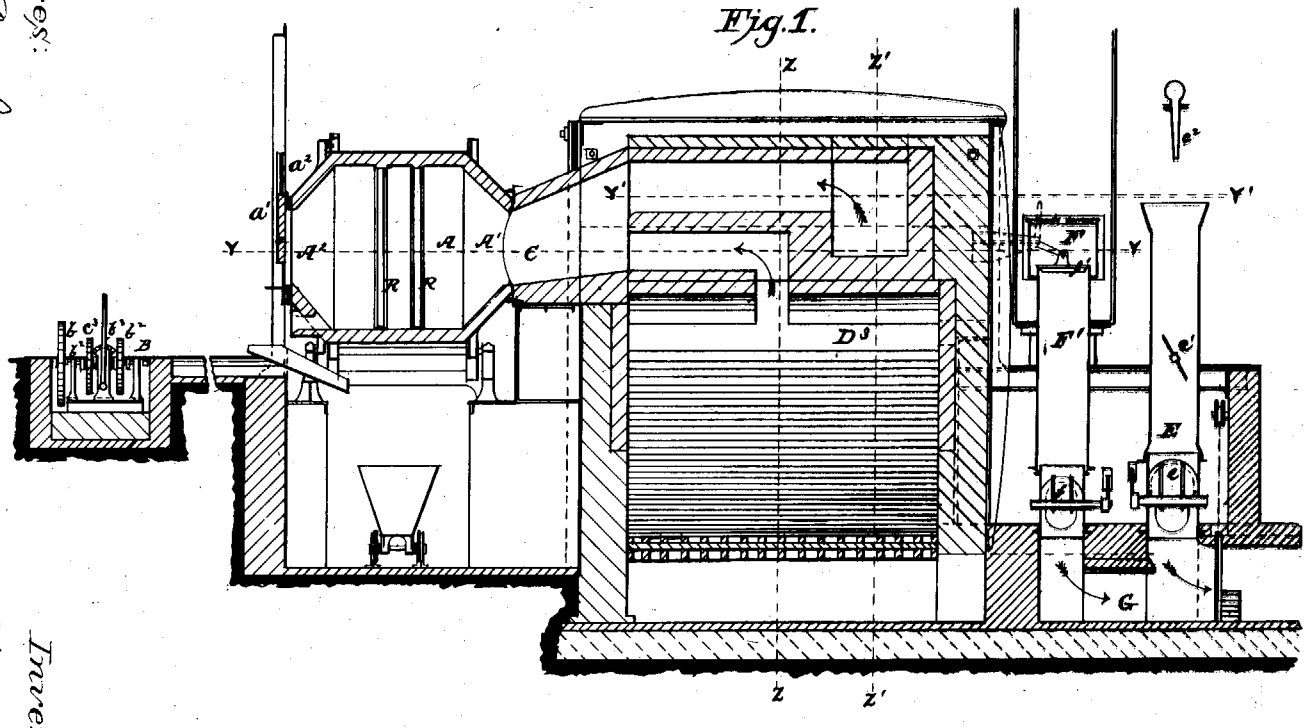
Figure 2:
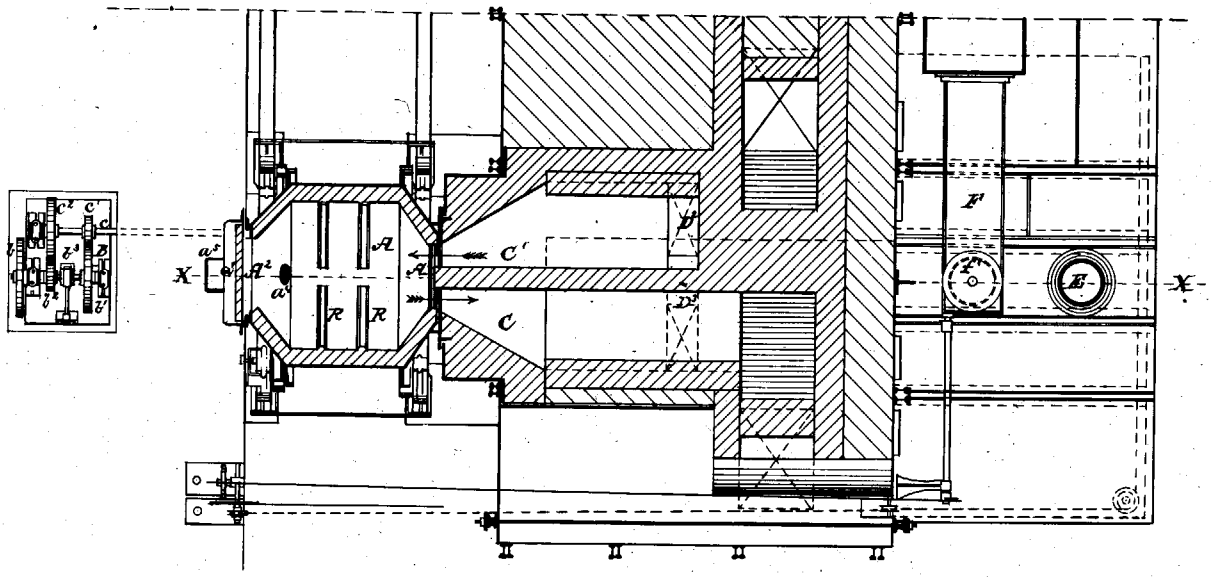
Figure 3:
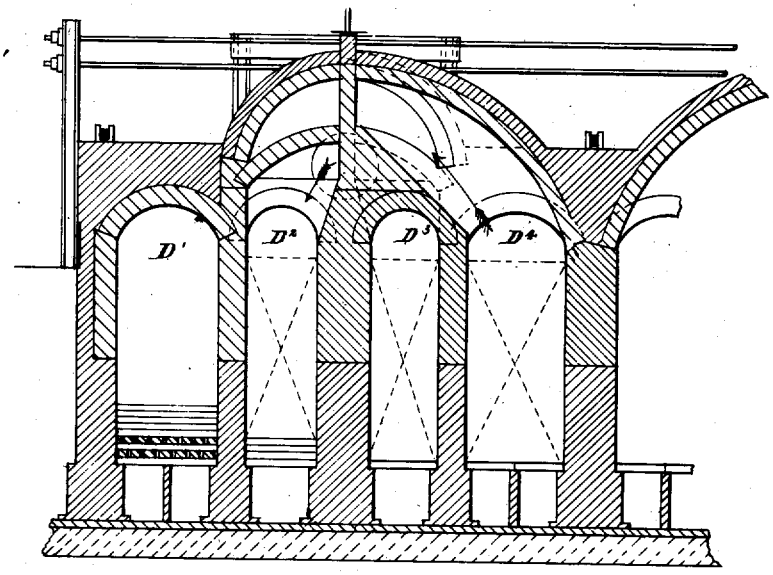
Figure 4:
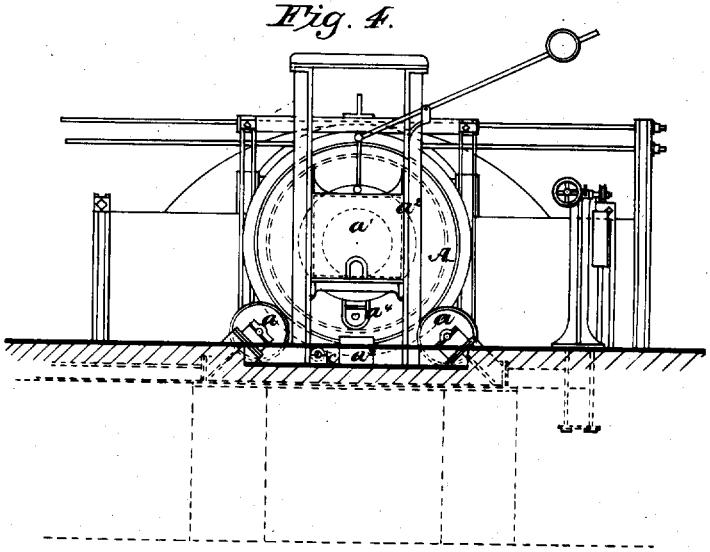

In the accompanying plate of drawings, in which corresponding parts are designated by similar letters, Figure 1 represents a longitudinal section on line X X, Fig. 2. Fig. 2 represents a sectional plan on lines *y y y' y'*, Fig. 1. Fig. 3 represents, on the left-hand side, a half-transverse section on the line *z z*, Fig. 1, and, on the right-hand side, a half-transverse section on the line *z' z'*, Fig. 1; and Fig. 4 shows a front view.

A is the rotative furnace, in shape cylindrical, with truncated conical ends. It is mounted on rollers *a a*, which are caused to revolve by gearing B, driven by any suitable power. The gearing B is arranged with clutch apparatus, so that the furnace can be rotated at either the slow or the quick speed or brought to rest while the prime mover continues to work at its regular speed. For this purpose the gearing B consists of a wheel, $b'$, and pinion $b^2$, loose on the shaft of the driving-wheel $b$, and gearing respectively with pinion $e'$ and wheel $c^2$ on shaft $c$, which drives the roller $a$. By means of a clutch, $b^3$, either the wheel $b'$ or the pinion $b^2$ is geared with the driving-shaft, and thus a slow or quick speed is imparted to the rotative furnace; or by throwing the clutch out of gear the furnace is brought to rest. The throat of the furnace A' is in communication with two flues, C and C', each of which has two branches, communicating respectively with two of four regenerative chambers, D' $D^2$ $D^3$ $D^4$. The outer regenerative chambers, D' $D^4$, are for heating the air, and the two inner chambers, $D^2$ and $D^3$, are for heating the gas supplied to the furnace.

The air is supplied by a main duct, E, provided with a reversing-valve, $e$, by which the supply can be turned toward either of the chambers D' or $D^4$ and the throttle-valve $e'$, whereby the supply can be regulated.

In order to increase the flow of air, when intense heat is required in the furnace, a jet of compressed air, $e^2$, is introduced from a blast-pipe into the middle of the duct E.

The gas from the main supply-trunk F is introduced by a duct, F', which is provided with a stop-valve, $f'$, and with a reversing-valve, $f$, whereby the gas can be directed to either of the chambers $D^2$ or $D^3$. The air and gas thus supplied to the two regenerative chambers on the one side of the structure flow thence, heated, into one of the flues C or C', where they mingle and produce a powerful flame, which plays into and sweeps around the furnace A, the products of combustion escaping by the other flues C or C' through the other two regenerative chambers, and thence by a flue, G, to the chimney or other outlet. When one of the two pairs of regenerative chambers has been sufficiently heated by the escaping products of combustion, and the other pair cooled by passage of the incoming air and gas through them, the valves are moved so as to alter the direction of the inflowing and outflowing currents in the manner well understood in reference to the working of regenerative gas-furnaces.

At the end $A^2$ of the furnace opposite the throat is mounted between the guides $a^2$ a vertically-sliding door, $a'$, with a counterbalance-weight, $a^3$. At the front of the furnace is formed a tap-hole, $a^4$, which can be plugged with refractory material, and under this there is a chute, $a^5$, by which material tapped from the furnace can be run into forms or molds or into a truck in a pit below the furnace.

The lining of the furnace A may be of any known suitable refractory material that is not readily affected by scoria; but I prefer to use for it a lining formed in the following manner: I take the mineral known as "bauxite," consisting chiefly of alumina, with a proportion of peroxide of iron. I calcine it and reduce it to powder, and mix with it from ten to fifteen per cent. of powdered plumbago, graphite, or other carbonaceous matter in a dense form, and such a quantity of argillaceous clay or other binding material as is necessary to give cohesion. I form this mixture into bricks or blocks of suitable form and burn them in a kiln in the usual way. In burning such bricks the oxide of iron contained in the bauxite is converted by the carbonaceous matter into metallic iron, and a very refractory material is thus produced, capable of resisting the action of scoria for a considerable time. These bricks may be built inside the rotating furnace with cement made from the above-named mixture used in an unburnt condition; but I prefer to build them in loosely, and after heating the furnace to a white heat, to charge it with pure ore or hammer-slag while rotating slowly. The ore or slag is melted and sinks into the crevices between the bricks, serving as a cement which binds them firmly together, and also as a glaze which prevents access of air to the interior of the bricks. When these bricks are so cemented the excess of fused ore or slag is tapped off and the furnace is ready for work.

The internally-projecting ribs R R differ from devices for like purposes heretofore used, in that portions thereof are omitted in the line of the tap-hole, in order that the ribs may not only have the effect of clinching the mass in the furnace, but that there may be a clear passage for the material to flow toward the front of the furnace when the tap-hole is opened.

Having thus described a rotative regenerative furnace which may be employed in the manufacture of iron and steel, and for other metallurgical purposes, I claim and desire to secure by Letters Patent of the United States—

1. In a regenerative furnace, the combination, with the regenerative chambers, of a rotative combustion-chamber, as and for the purposes described.

2. A regenerative furnace provided with an air-blast pipe within the air-inlet conduit, as and for the purposes described.

3. A rotative combustion-chamber, in combination with a regenerative furnace in which the throat communicating with the combustion-chamber is divided into four passages, each of which communicates with a separate regenerative chamber situated on the same side of the combustion-chamber.

4. A rotative combustion-chamber, in combination with a regenerative furnace having the regenerative chambers and passages connected therewith situated on one and the same side of the combustion-chamber.

5. A rotative combustion-chamber, in combination with a regenerative furnace provided with air and gas openings, substantially as described, whereby the heated gas and air enter on one side of the throat of the furnace and the products of combustion escape on the other.

6. A rotative combustion-chamber, in combination with a regenerative furnace having air and gas openings, substantially as and for the purposes described, and provided with a working-door at the end of the combustion-chamber opposite the such openings.

7. Blocks or bricks for a furnace-lining, composed of bauxite, clay, and other binding material and dense carbonaceous matter, compounded as described.

8. A lining for rotative furnaces, composed chiefly of bauxite and dense carbonaceous matter, built loosely in the furnace, and cemented or glazed by melted ore or hammer-scale, as and for the purposes described.

9. A rotative furnace provided with internally-projecting ribs, a portion of which is omitted in the line of the tap-hole, as and for the purposes described.

C. WILLIAM SIEMENS.

Witnesses:
GEO. WOOLLETT,
H. S. THRUPP,
*Clerks to Ridgway Bros., 2 Waterloo Place, Pall Mall, London, Notaries.*